United States Patent [19]
Yarborough, Jr.

[11] 4,412,329
[45] Oct. 25, 1983

[54] PARITY BIT LOCK-ON METHOD AND APPARATUS

[75] Inventor: John M. Yarborough, Jr., Palo Alto, Calif.

[73] Assignee: SRI International, Menlo Park, Calif.

[21] Appl. No.: 311,782

[22] Filed: Oct. 15, 1981

[51] Int. Cl.³ .............................................. H04L 7/02
[52] U.S. Cl. ...................................... 371/47; 371/42; 371/49; 375/106
[58] Field of Search ............................ 371/47, 49, 42; 375/106, 110; 307/269

[56] References Cited

U.S. PATENT DOCUMENTS

| | | | |
|---|---|---|---|
| 3,587,043 | 6/1971 | Mengani | 371/47 |
| 3,842,399 | 10/1974 | Kneuer et al. | 375/110 |
| 3,938,086 | 2/1976 | Valbonesi | 371/42 |
| 4,361,898 | 11/1982 | Griffiths et al. | 375/114 |

*Primary Examiner*—Charles E. Atkinson
*Attorney, Agent, or Firm*—Victor R. Beckman

[57] ABSTRACT

Method and apparatus for locking onto the parity bit of a bit stream of equal length words, each of which words includes a parity bit, are disclosed. The bit stream is shifted through a data shift register which includes a plurality of word length sections. Parity of bits contained in the first section of the data shift register is checked every bit interval of the bit stream. Two parity bit shift registers are provided, the first of which is one word in the length and the second of which is of the same length as the data shift register. The output from the parity checking means is connected to serial inputs of said first and second parity bit shift registers through a logic gate controlled by the serial output from the first parity bit shift register. When the serial output from the first parity bit shift register is a "one" bit, the results of the parity check are entered into said first and second parity bit shift registers through said logic gate, and when the serial output therefrom is a "zero" bit, a "zero" bit is entered into said first and second parity bit shift registers. Means are provided for connecting parallel outputs of said second parity bit shift register to a decision logic circuit having a word clock pulse output which is synchronized with parity bits in the bit stream when the apparatus is locked onto parity bits in the stream.

10 Claims, 5 Drawing Figures

PARITY BIT LOCK-ON METHOD AND APPARATUS

ORIGIN OF THE INVENTION

The Government has rights to this invention pursuant to Contract Number N01-NS-3-2322.

BACKGROUND OF THE INVENTION

A novel parity bit lock-on circuit is disclosed in a copending patent application Ser. No. 311,783, filed concurrently herewith, by Charles S. Weaver and John M. Yarborough Jr., entitled Digital Data Transmission With Parity Bit Word Lock-On, which application is assigned to the assignee of the present invention. The parity bit lock-on circuit disclosed therein includes means for locking onto parity bits included in a serial bit stream consisting of equal length words, each of which words includes a parity bit. Word-length groups of bits of the bit stream are checked for parity at every bit interval of the stream. A shift register one word length in size is provided into which the output from the parity checker is shifted if the serial output from the register is a parity true signal. If the serial output from the shift register is a parity error signal, then a parity error signal is reentered into the shift register. Whenever the shift register contains parity error signals at all but one given register stage, a word clock is produced in synchronization with the parity bit in the serial word stream. Generally, parity bit lock-on is not achieved until a plurality of words have passed through the circuit which words are lost. The present invention is directed to means for reducing the number of words lost before parity bit lock-on.

SUMMARY OF THE INVENTION

The present invention is achieved by feeding the serial bit stream of equal length words, each with a parity bit, to the serial input of a data shift register having a length of two or more words. The parity of the first word length group of bits in the data register is checked by a parity checker as each bit is shifted into the register. First and second parity shift registers are provided for storage of parity true and parity error signals from the parity checker; the first parity shift register being one word length in size, and the second parity shift register being of the same length as the data shift register. Serial inputs for the first and second parity shift registers are obtained from a parity bit trial gate comprising a logic gate having inputs from the parity checker and from the serial output of the first parity shift register. If the serial output from the first parity shift register is true, then the output from the parity checker is shifted into the serial input of said parity registers through the parity bit trial gate. On the other hand, if the serial output from the first parity shift register is a parity error signal, an error signal is reentered into the parity registers. A logic gate responsive to parallel outputs of the first parity shift register produces an output whenever the first parity register contains all parity error signals, which output is used to reload the register with all parity true signals.

Word length groups of parallel outputs of the second parity bit shift register are supplied to logic gates which have an output whenever all but one given stage of the group contain parity error signals, and the one stage contains a parity true signal. These logic gate outputs, together with outputs from said one given stage of each group, are supplied to a decision logic gate circuit from which word clock signals in synchronization with parity bits in the serial data stream are obtained when the circuit is locked onto the parity bits.

The invention, together with advantages thereof over prior art arrangements, will be better understood from the following description when considered with the accompanying drawings.

Figure 1:
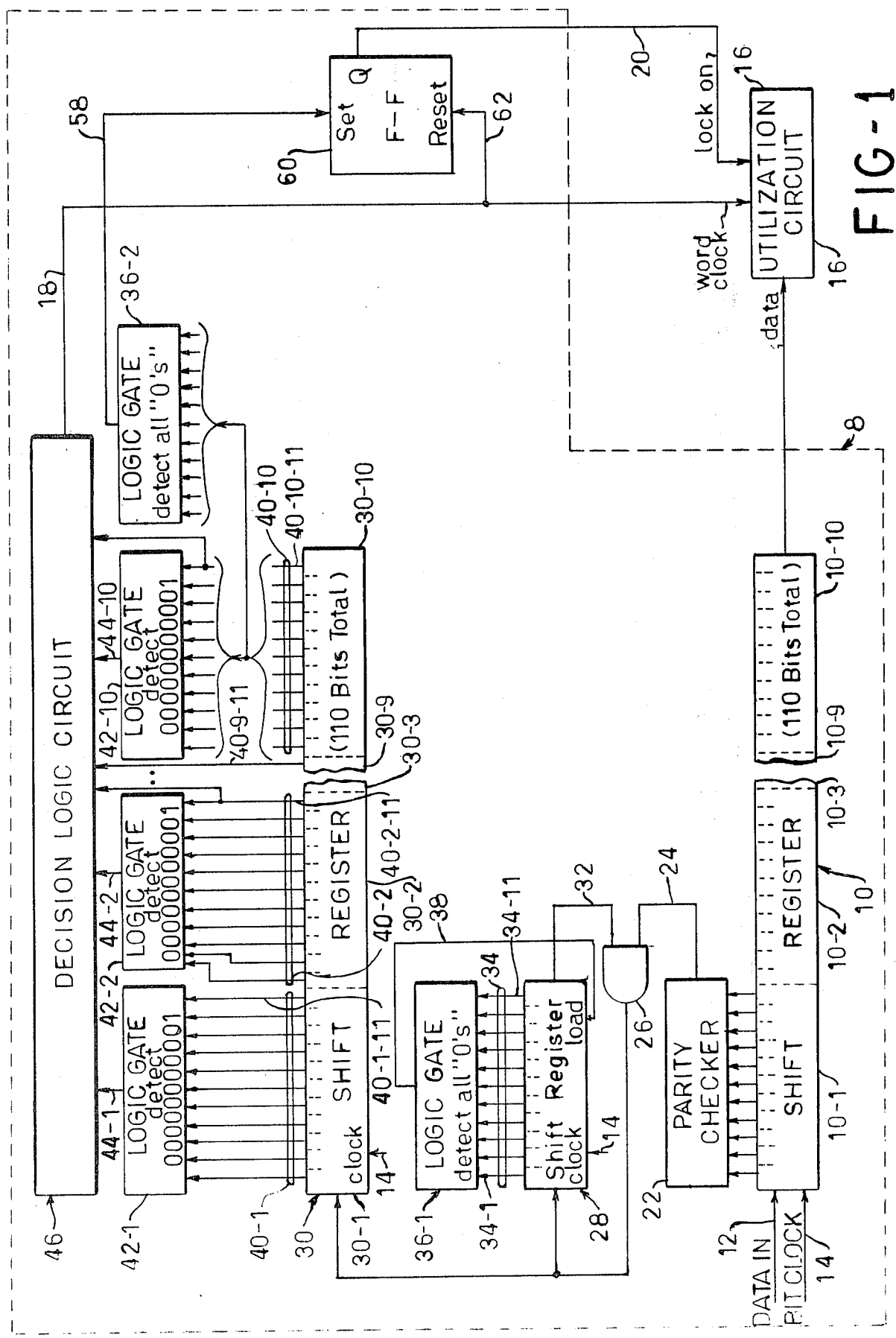
FIG. 1 is a block diagram of the novel parity bit lock-on circuit embodying the present invention.

The parity bit lock-on circuit of the present invention functions to lock onto the parity bits included in a serial bit stream consisting of equal length words, each of which words includes a parity bit. For purposes of illustration, and not by way of limitation, the parity bit lock-on circuit shown in FIG. 1 is adapted for use with a serial bit stream comprising words which are eleven bits in length and wherein the first bit of each said eleven-bit word comprises a parity bit. The serial bit stream may comprise, for example, words consisting of a parity bit followed by ten data bits. A bit clock is required for feeding the serial bit stream to the parity lock-on circuit.

Reference now is made to FIG. 1 wherein the novel parity bit lock-on circuit 8 of this invention is shown comprising a data shift register 10 having a serial input 12 into which the serial bit stream is shifted under control of a bit clock signal at line 14 thereof. The data shift register 10 must be of sufficient length to hold two or more words and, for purposes of illustration, a ten word length register is shown in which word length groups of stages are individually identified by reference characters 10-1 through 10-10. For use with eleven bit words, a 110 bit register is required. Data output is obtained from the last section 10-10 of the register through either serial or parallel output terminals. In FIG. 1, the serial output terminal of the register is shown connected to a utilization circuit 16. The novel parity bit lock-on circuit 8 locks onto the parity bit in the serial bit data stream supplied to the register 10 and, when so locked on, generates a word clock signal at output line 18 which also is supplied to the utilization circuit for word synchronization of the data. Another output at line 20 is provided to indicate when the circuit is locked onto the parity bit.

The eleven parallel outputs from the first section 10-1 of the data shift register are connected to a parity checker 22 for parity checking the eleven bits contained in the register section every bit interval of the data stream. Either even or odd parity checking is employed depending upon whether an even or odd parity system, respectively is employed. As the bit stream is shifted into the data register 10, parity is checked at each bit interval and, depending upon the results of the parity check a parity "true" or parity "error" signal is produced at output line 24 of the parity checker comprising a 1-bit or a 0-bit, respectively. It here will be noted that in the present description "one" and "zero" bits are not necessarily represented by high and low signals, respectively. That is, for an understanding of the block diagram showing of the invention of FIG. 1 it is not required that a single convention be employed for representing the binary digits.

The output of parity checker 22 at line 24 is connected to one input of a logic gate 26 shown comprising an AND gate. The AND gate output is connected to serial inputs of first and second parity bit shift registers 28 and 30, respectively. The first parity bit register 28 is one word in length whereas the second parity bit register 30 is the same length as the data register 10. Thus, in the illustrated arrangement, the registers 28 and 30 include 11 and 110 stages respectively. These parity bit registers are clocked by the same bit clock pulses supplied to data register 10 at line 14.

The serial output of the first parity bit register 28 is connected over line 32 to the second input of the logic gate 26. When the output of the first parity bit register 28 is a 1-bit, either a 1-bit or 0-bit is shifted into registers 28 and 30 depending whether the output from the parity checker 22 is a 1-bit or a 0-bit, respectively. If, on the other hand, the serial output from register 28 is a "zero" bit, then the output from gate 26 is a "zero" bit regardless of the parity checker output. Essentially, then, results of the parity check are entered into the parity bit registers 28 and 30 so long as the serial output of register 28 is a "one", or parity true, bit. When the serial output from register 28 is a "zero", or parity false, bit, a "zero" bit is reentered into register 28 and a "zero" bit is entered into register 30.

The parallel outputs 34 of shift register 28 are connected to a first logic gate means 36-1 having a "one" output at output line 38 when all of the input lines 34-1 through 34-11 are "zero". With any other combination of inputs, i.e. if any one or more input lines is a "one" the output from logic gate 36-1 is a "zero". The "one" output at line 38 produced when all stages of the first parity bit shift register 28 contain a "zero" bit, is connected over the output line 38 to the "load" input terminal of the register 28 to load the same with all 1-bits. Thus, when all "zero" bits are shifted into the register 28, the register immediately is loaded with all "one"0 bits by application of a "load" input signal thereto from logic gate 36-1.

The second parity bit register 30 includes ten word length sections 30-1 through 30-10 each having eleven parallel output lines 40-1 through 40-10 connected to logic gate means 42-1 through 42-10, respectively, only three of which groups of output lines and gate means are shown in the drawing. The logic gate means 42-1 through 42-10 have a "one" output at output lines 44-1 through 44-10 whenever the associated first ten input lines thereto are "zeros" and the associated output line 40-1-11 through 40-10-11 is a "one". With any other combination of inputs, the output from the logic gates 42-1 through 42-10 is zero.

Figures 2, 3C:
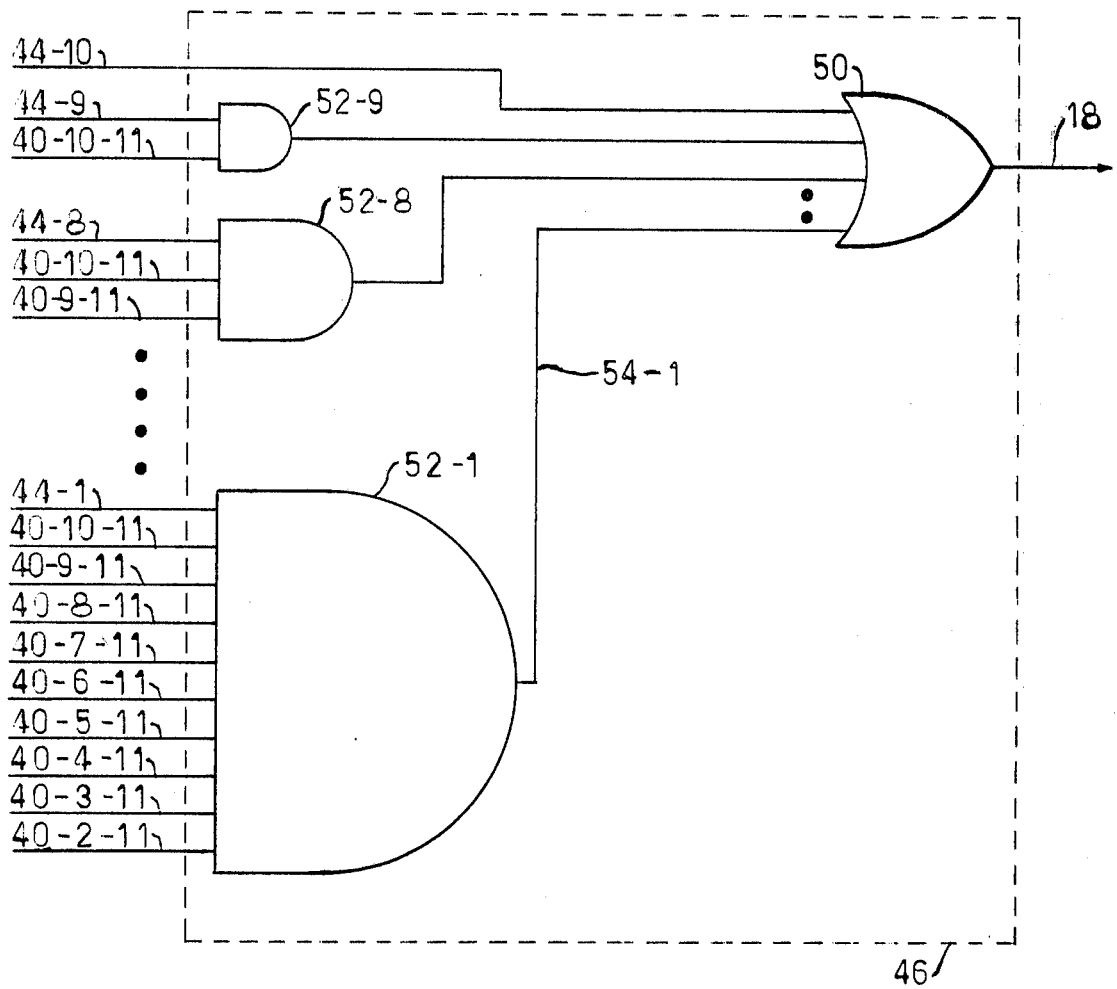
FIG. 2 is a simplified showing of details of a decision logic circuit included in the block diagram of FIG. 1, and FIGS. 3A and 3B, taken together as shown in FIG. 3C, show signals appearing at various locations of the novel parity bit lock-on circuit shown in FIG. 1 for use in explaining operation thereof.

Output lines 44-1 through 44-10 from the respective gates 42-1 through 42-10 are connected to a decision logic circuit 46. In addition, the output stage of each shift register section 30-2 through 30-10 is directly connected by respective output lines 40-2-11 through 40-10-11 to the decision logic circuit 46. A word clock signal is produced at the output line 18 of the decision logic circuit in synchronization with the word parity bit when the circuit is locked onto a parity bit of the word contained in section 10-10 of data shift register 10. In FIG. 2, to which reference is made, the decision logic circuit 46 is shown to include an OR gate 50 having an output connected to the output line 18 from the circuit. One input to the OR gate is provided by the output from logic gate 42-10 over line 44-10. It will be seen then, that if register section 30-10 of the second parity bit shift register 30 contains the bit combination "00000000001", the detector 42-10 output is a "one", which signal is connected through OR gate 50 to output line 18. As noted above and as will become apparent herein below, the output at line 18 comprises word clock signals which are synchronized with parity bits included in the data stream in the data register 10.

Word clock pulses also are produced at line 18 whenever a "one" signal is produced at the output of any of the other logic gates 42-1 through 42-9, and "one" signals are present at all lines 40-2-11 through 40-10-11 upstream of said logic gate output. AND logic gates 52-1 through 52-9 (only three of which are shown) are included in the decision logic circuit 46 to provide for such word clock pulse outputs. As seen in FIG. 2, inputs for AND gate 52-1 are obtained from lines 44-1 and 40-2-11 through 40-10-11 whereby a word clock pulse is produced at output line 54-1 of the gate when all such input lines are "one". Inputs for other AND gates are provided by an output from one of the logic gates 42-2 through 42-9 and those lines 40-3-11 through 40-10-11 which are upstream thereof.

The eleven parallel output lines 40-10 from the last shift register section 30-10 are also connected to a second logic gate means 36-2 having a "one" at output line 58 when all of the input lines thereto are "zero". As with logic gate 36-1, with any other combination of inputs, the output from the gate 36-2 is "zero". Output line 58 is connected to the set terminal of a flip-flop 60 for setting the same. Word clock signals are supplied to the reset terminal of the flip-flop to reset the flip-flop if it is in a set condition. When reset, the Q output goes to a "one" level which is connected over line 20 to the utilization circuit 16 to signal that the circuit 8 is locked onto a parity bit. Loss of the lock-on condition is signalled when the flip-flop is set by an output from the all "zero" detector 36-2.

Figure 3A:
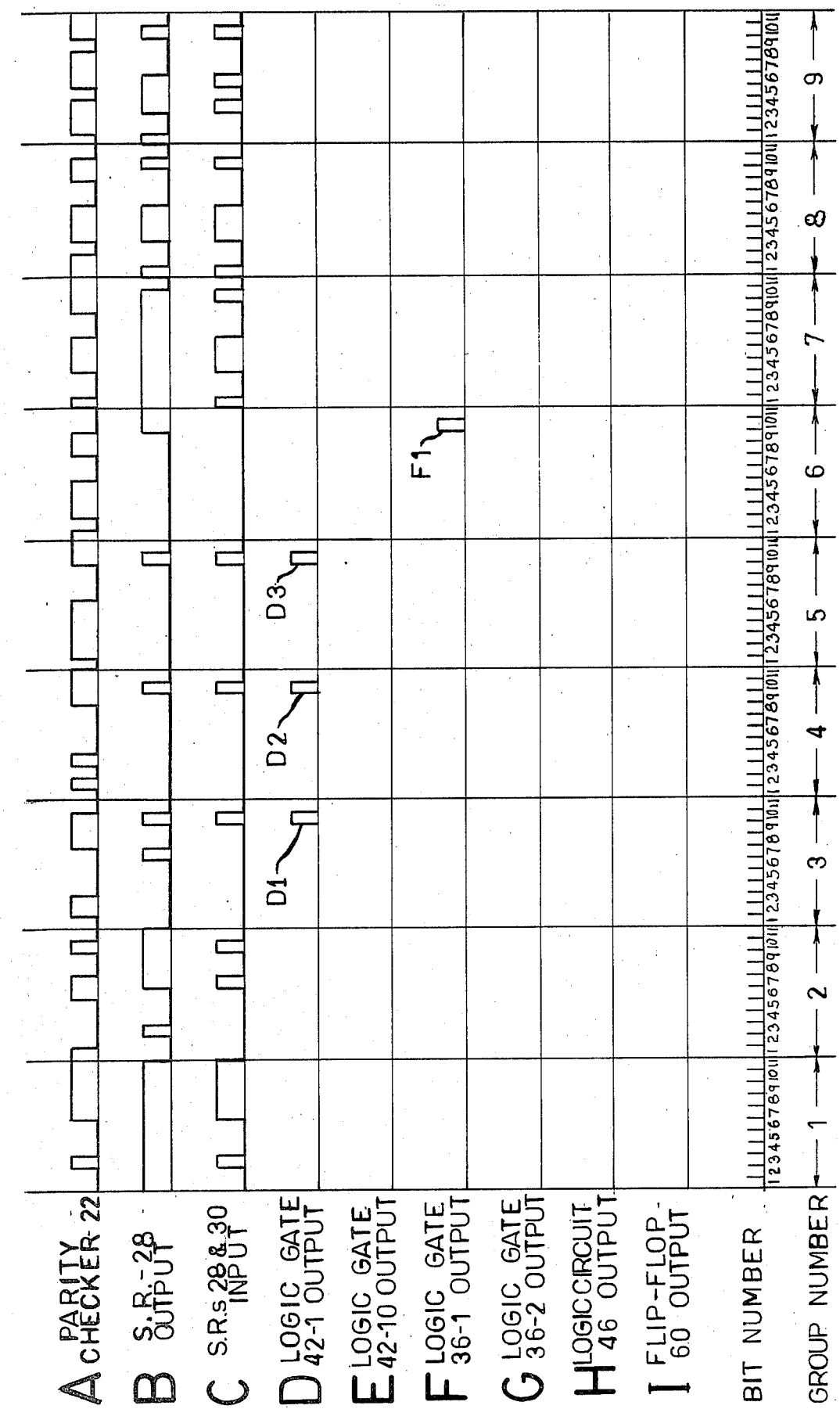
Figure 3B:
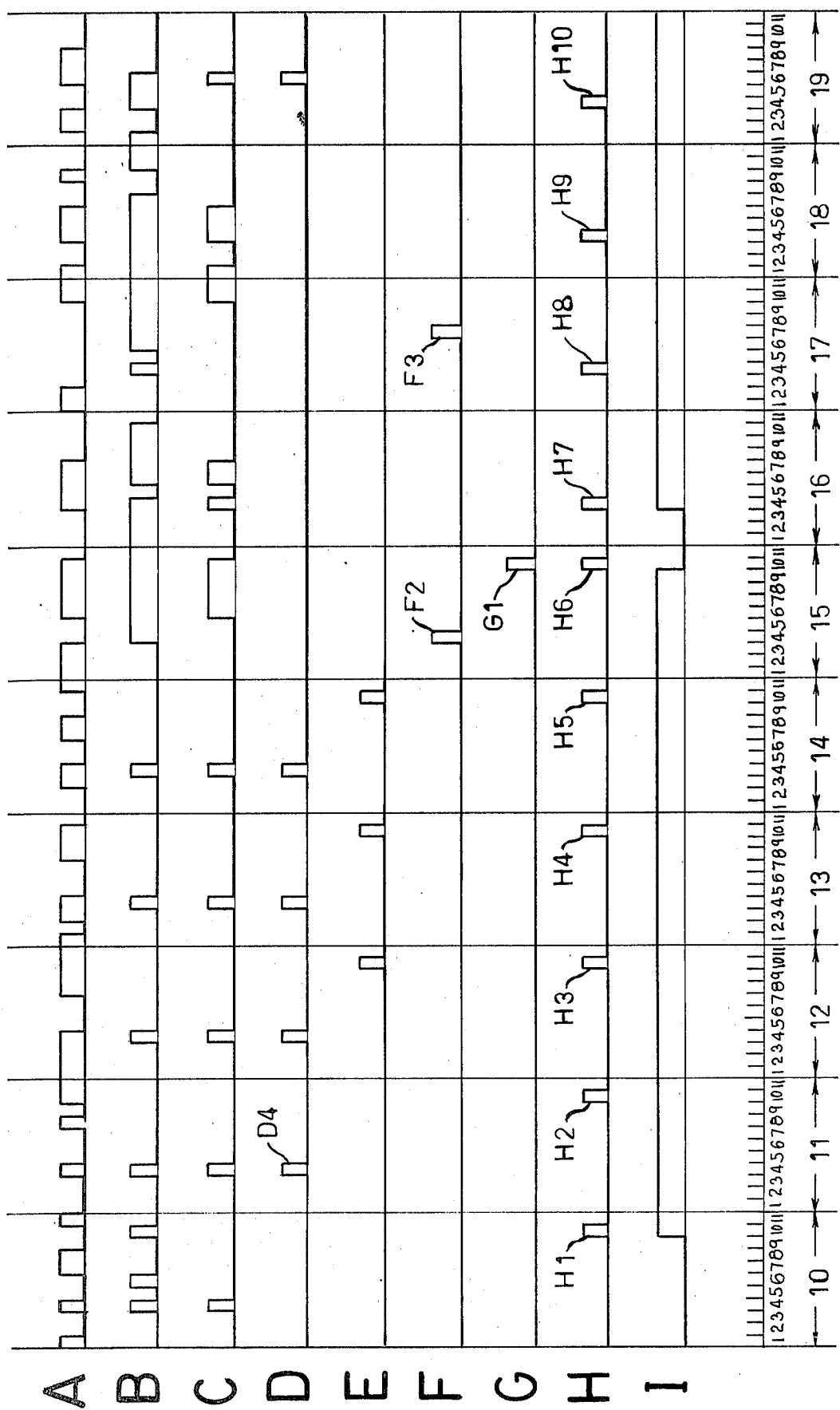

Operation of the parity bit lock-on circuit 8 of this invention will best be understood with reference to the waveforms of FIGS. 3A and 3B. Bits of the waveforms are shown divided into arbitrary bit groups 1 through 19, with each group consisting of eleven (11) bits numbered 1 through 11. Since each word in the data pulse train consists of ten (10) data bits and a parity bit, it is known that ten of the eleven bits in each group comprise data bits and one comprises the parity bit onto which the circuit locks. Until parity bit lock-on is achieved, it is not known which bit in the group comprises the parity bit. As mentioned above, the present circuit operates on a data stream in which the parity bit preceeds the data bits.

Assume that the first parity bit shift register 28 is loaded with all "one" bits, as by application of a signal to the load input thereof. Consequently, as bits are clocked through the register 28, the serial output from the register at line 32 to AND gate 26 will be a 1-bit for at least the first eleven clock pulses. With a 1-bit at line 32 to the AND gate, the gate output is a 1-bit if the parity checker 22 output is a 1-bit (parity true), and is a 0-bit if the parity checker output is a 0-bit (parity error). When bit number 1 of bit group 1 is shifted into data shift register 10, a parity check of the eleven bits in section 10-1 of the register results in a "zero", parity error, output from the parity checker 22, as seen at waveform A of FIG. 3A. As a result, the output from AND gate 26 is "zero" which output is shifted into the serial inputs of first and second parity shift registers 28 and 30, waveform C. The next input bit (i.e. bit 2 of bit group 1) is shifted into data register 10, the parity of the eleven (11) bits contained in the first section 10-1 thereof again is checked and as seen at waveform A, produces a parity check output of "zero" which is shifted into registers 28 and 30 through AND gate 26. At bit number 3 of bit group 1, the parity checker output is a 1-bit, i.e. true, which "one" signal is transferred to the inputs of registers 28 and 30. Waveform A of FIG. 3A shows that parity checker outputs of zero were produced when checking the contents of data register section 10-1 when bits 1, 2, 4, 5 and 6 were shifted into data register 10, and parity checker outputs of "one" (i.e. parity true) were produced when bits 3, 7, 8, 9, 10 and 11 of group 1 were entered into register 10.

Now, at bit 1 of bit group 2, the output from shift register 28 is "zero" (see waveform B) whereby one input to AND gate 26 is "zero" yielding "zero" output from gate 26 and which "zero" is entered into registers 28 and 30. In this case, regardless of the output from the parity checker 22, a "zero" at the serial output of register 28 results in a "zero" being entered into registers 28 and 30. Essentially, then, it will be seen that parity is checked at every bit interval of the data stream, and the result of such parity checking is entered into the parity bit shift registers 28 and 30 so long as prior integral multiple groups of bits have produced parity "true" outputs.

Upon shifting all eleven of the group 1 bits into data register 10, on the average, parity will check true for one half the parity checks. In the illustrated arrangement parity checked true when the six bits 3, 7, 8, 9, 10, and 11 of group 1 were entered. Now, as group 2 bits are shifted into the data register 10, parity essentially is checked only upon entry of bits 3, 7, 8, 9, 10 and 11, for which parity checked true during parity checking of corresponding group 1 bits. Of these group 2 bits (i.e. bits 3, 7, 8, 9, 10 and 11) a parity checker output of "zero" is produced when bits 3, 8, 9 and 11 are entered into the data register, and a parity checker output of "one" is produced when bits 7 and 10 are entered (see waveform A). These "zeros" and "ones" are entered into the parity bit shift registers 28 and 30. For all other bits, a "zero" is entered into the registers 28 and 30 since the output from register 28 is "zero".

Now, as group 3 data bits are entered into data register 10, parity essentially is checked only as bits 7 and 10 are entered. From waveform A, it will be seen that the parity bit generator output is "zero" at bit 7 of group 3 whereby a "zero" is entered into registers 28 and 30. Now, shift register 28 and section 30-1 of shift register 30 contain a single "ones" bit, here bit 10, while the remainder are "zero" bits. When this "ones" bit is shifted into the final stage of register section 30-1 an output pulse D1 is obtained from logic gate 42-1 (waveform D of FIG. 3A) which is synchronized with the parity bit in the data stream, which parity bit is located at the final stage of shift register section 10-1.

The output from logic gate 42-1 is supplied over line 44-1 to the decision logic circuit 46 which, as described above, produces a pulse output whenever an input at one of the lines 44-1 through 44-10 from a logic gate is high, and inputs from all upstream lines 40-2-11 through 40-10-11 at the last stage of register sections 30-2 through 30-10, respectively, also are high. An examination of waveform C of FIG. 3A shows that a 1-bit was entered into register 30 when data bit 10 of the group 1 and the group 2 bits were entered into register 10. It will be seen, then, that when the bit combination 00000000001 is shifted into section 30-8 of register 30, the last stages of shift register sections 30-9 and 30-10 will contain these "ones" bits. Logic gate 42-8 responds to the bit combination 00000000001 for production of a "one" signal at the output line 44-8 thereof (FIG. 2). The "one" signal at line 44-8 together with the "one" signals at lines 40-9-11 and 40-10-11 are supplied to gate 52-8 (FIG. 2) of decision logic circuit 46 to produce a "one" signal at the outputs of AND gate 52-8 and OR gate 50 at line 18 from decision logic circuit 46, which output is identified by reference character H1 in FIG. 3B. The "one" signal output at line 18 is synchronized with the parity bit at the final stage of the data register 10 to provide a word clock pulse for the word contained in section 10-10 of register 10. This first word clock pulse H1 is seen to occur when shifting group 10 data bits into the ten-word data register 10 (Waveform H, FIG. 3B).

One word length later, that is, after eleven more bit shifts of registers 10 and 30, the bit combination 00000000001 is shifted into register section 30-9 whereupon the output at line 44-9 of logic gate 42-9 is "one". This output, together with the "one" output at line 40-10-11 of register section 30-10, at the input to decision logic circuit 46 (i.e. to AND gate 52-9, FIG. 2) results in another "ones" output from the circuit 46 at line 18, which output is identified by reference character H2 in FIG. 3B. When this bit combination 00000000001 is shifted into register section 30-10, the logic gate 42-10 produces a "one" output at line 44-10 connected to the decision logic circuit 46 for production of word clock pulse H3 at the output line 18 thereof. With the parity bit lock-on circuit disclosed in the above-mentioned copending patent application, parity bit lock-on would first occur with word clock pulse H3 resulting in the loss of two previous words. With the present arrangement, employing data and parity bit shift registers 10 and 30, respectively, which are greater than one word in length, parity bit lock-on is possible with loss of fewer data bits.

As noted above, when word length parity bit shift register 28 contains a single "ones" bit, parity essentially is checked once every eleven bits of the bit stream, when the "ones" bit is in the last stage of register 28. So long as the parity checker output is true at this time, a "one" is shifted into the registers 28 and 30 every eleven bits to provide for the parity bit combinations "00000000001" which, in register 30, is detected by logic gates 42-1 through 42-10 as the bit combination shifts through register 30. A word clock signal (waveform H) is produced in synchronization with the parity bit so long as the circuit remains locked onto parity bits. The word clock output H, from the decision logic circuit 46 resets flip-flop 60, whereupon the flip-flop output (waveform I) goes to a "one" state to signify that parity bit lock-on is achieved.

If, after lock-on, parity fails to check, i.e. if the parity generator output is "zero" when the parity bit is checked, the AND gate 26 output is "zero", which "zero" is entered into parity bit registers 28 and 30. Now every stage of shift register 28, and of shift register section 30-1 of register 30 is loaded with a "zero" bit. Subsequently, when this group of eleven zero bits contained in register 30 is shifted into register section 30-10 thereof, logic gate 36-2 connected to parallel outputs of the register section 30-10, produces a "one" at the output thereof (G1 of waveform G) which, as noted above, sets the flip-flop 60. The resultant low flip-flop 60 output (waveform I, FIG. 3B) indicates that the parity bit lock-on circuit 8 no longer is locked onto a parity bit. This output is shown supplied over line 20 to the utilization circuit 16 to disable the circuit during loss of parity bit lock-on.

When this group of eleven zero bits was shifted into parity bit register 28, logic gate 36-1 connected to parallel outputs of the register produces a "one" output F1 shown at waveform F of FIG. 3A. This output from logic gate 36-1 is supplied as a load signal to shift register 28 to load the contents of the register with all "ones" as seen at waveform B of FIG. 3A. Parity checking continues in the manner described above until the parity bit combination 00000000001 again is entered into the registers 28 and 30 from the output of AND gate 26 in the parity bit lock-on process. After setting the contents of the register 28 to all "ones" in response to output F1 of logic gate 36-1 at bit group 6 (FIG. 3A), the parity bit combination 00000000001 is next detected at bit group 11 (FIG. 3B) as indicated by the output D4 from logic gate 42-1 (waveform D, FIG. 3B). Now, the circuit is locked onto parity bits occuring at bit 4 of the bit groups beginning at bit group 11, FIG. 3B. It will be noted that when checking parity at bit 4 of downstream groups 10, 9, 8 and 7, true parity check outputs were produced during such parity checking. Consequently, when the parity bit combination 00000000001 reaches parity bit register section 30-6 a "one" output is produced by logic gate 42-6 which, together with "one" outputs at the last stages of sections 30-7, 30-8, 30-9 and 30-10, results in a "one" output H7 from decision logic circuit 46 (waveform H) at group 16, to indicate that the circuit again is locked onto a parity bit. It will be noted that only several bits were lost between loss of parity bit lock-on (upon occurance of G1) and subsequent parity bit lock-on (upon occurance of H7).

The invention having been described in detail in accordance with requirements of the Patent Statutes, various changes and modifications will suggest themselves to those skilled in this art. For example, the length of the data and parity bit registers 10 and 30 may be some other integral multiple of the data word length. In general, the longer these registers, the fewer correct words will be lost. Obviously, data may be read from register section 10-10 in parallel, if desired, rather than in serial form. Also, the parity bit may be stripped from the data bits when reading words from register section 10-10. Also, with minor modifications, it will be apparent that operation of the parity bit lock-on circuit with a bit stream wherein the parity bit is positioned after the data bits, or any position within the data bits, rather than before the data bits may be provided. It is intended that these and other such changes and modifications shall fall within the spirit and scope of the invention as defined in the appended claims.

I claim:

1. Parity bit lock-on apparatus for use in locking onto parity bits included in a serial bit stream of equal length words each of which words includes a plurality of data bits and a parity bit, said apparatus comprising,
   a data shift register having a serial input into which the serial bit stream is shifted and including a plurality of word length sections,
   means for parity checking the word length group of bits contained in the first section of the data shift register every bit interval of the bit stream shifted into the register,
   a first parity bit shift register having a serial input and a serial output, and having a length of one word,
   a second parity bit shift register having a serial input, parallel outputs and having a length equal to that of the data shift register,
   means under control of the serial output of said first parity bit register for shifting the output from said parity checking means into the serial inputs of said first and second parity bit shift registers when the serial output from said first parity bit shift register is a 1-bit and for shifting a 0-bit into the first and second parity bit shift registers when the serial output from the first parity bit shift register is a 0-bit, and
   means responsive to parallel outputs from said second parity bit shift register for generating word clock pulses in synchronization with parity bits of words shifted into the final stage of said data shift register.

2. Parity bit lock-on apparatus as defined in claim 1 including,
   means for loading all stages of said first parity bit shift register with "one" bits whenever all stages thereof contain "zero" bits.

3. Parity bit lock-on apparatus as defined in claim 2 wherein said means for loading all said stages of said first parity bit shift register with "one" bits includes means responsive to parllel outputs from said first parity bit shift register for producing a "one" output only when every stage of said register contains a "zero" bit, and
   means connecting the output from said means responsive to parallel outputs from said first parity bit shift register to said shift register as a load signal for loading the register with "one" bits.

4. Parity bit lock-on apparatus as defined in claim 1 including,
   a flip-flop having one output state when the apparatus is locked onto parity bits in the bit stream and another output state when the apparatus is not locked onto parity bits,
   means for setting said flip-flop when every stage of the last section of the second parity bit shift register contains a "zero" bit and for resetting said flip-flop in response to a word clock pulse.

5. Parity bit lock-on apparatus for use in locking onto parity bits included in a serial bit stream of equal length words each of which words includes a parity bit, said apparatus comprising,
   a data shift register m word length sections in size and including a serial input and parallel outputs at at least the first word length section thereof, wherein m is an integer greater than 1,
   means for shifting the serial bit stream into the serial input of said data shift register,
   parity checker means responsive to parallel outputs of the first section of said data shift register for checking a word length group of bits as each bit is shifted into said data register,
   first and second parity bit shift registers one word length and m word length sections in size, respectively, said first parity bit register including a serial input, a serial output and parallel outputs, said second parity bit register including a serial input and parallel outputs, a logic gate having first and second inputs and an output, means for connecting outputs from said parity checker means and serial output of said first parity bit shift register to said first and second inputs of said logic gate, means for connecting the output from said logic gate to the serial inputs of said first and second parity bit shift registers, m logic gating means responsive to parallel outputs from respective m sections of said parity bit shift register, each of which logic gating means produces an output upon the simultaneous presence of a 1-bit at one selected parallel output of each register section and 0-bits at other parallel outputs, decision logic circuit means responsive to outputs from said m logic gating means and from said one selected parallel output of each register section of the second parity bit shift register for producing an output upon the simultaneous presence of an output from one of said m logic gating means and every one selected parallel output upstream of said one logic gating means, the output from said decision logic circuit means being produced in synchronization with the presence of a parity bit in the word bit stream at a selected stage of the last section of the data shift register.

6. Parity bit lock-on apparatus as defined in claim 5 including, first logic gating means responsive to parallel outputs from said first parity bit shift register for producing an output upon the simultaneous presence of "zero" bits at all of said parallel outputs, and means responsive to the output from said first logic gating means for loading said first parity bit shift register with "one" bits.

7. Parity bit lock-on apparatus as defined in claim 6 including second logic gating means responsive to parallel outputs from the $m^{th}$ section of the second parity bit shift register for producing an output upon the simultaneous presence of "zero" bits at all of said parallel outputs, and a flip-flop which is set by an output from one of said decision logic circuit means and second logic gating means and is reset by an output from the other thereof, the flip-flop output being in a first state when the apparatus is locked onto parity bits in the word stream and in a second gate when the apparatus is not locked onto parity bits.

8. A method of locking onto parity bits included in a serial bit stream of equal length words, each of which words includes a parity bit, said method including, clocking the serial bit stream into the serial input of a data shift register m world length sections in size, wherein m is an integer greater than 1, at one bit intervals, checking parity of bits contained in the first section of the data shift register to obtain parity true and parity error signals when parity checks and fails to check, respectively, supplying the parity signal to the serial inputs of first and second parity bit shift registers which are one word length and m word length sections in size, respectively, whenever a selected stage of said first parity bit shift register contains a true signal, otherwise supplying a parity error signal to said first and second parity bit shift registers regardless of the results of checking parity, and producing a word clock pulse when at least one section of said second parity bit shift register contains parity error signals in all but one given stage, and the one given stage of said one section and of all sections upstream of said one section contain a parity true signal.

9. A method of locking onto parity bits as defined in claim 8 including, loading all stages of said first parity bit shift register with parity true signals whenever all stages thereof contain parity error signals.

10. A method of locking onto parity bits as defined in claim 8 including, producing a loss of parity lock-on signal at the output of a flip-flop by setting the flip-flop when all stages of the $m^{th}$ section of said second parity bit shift register contain parity error signals, and resetting the flip-flop in response to word clock pulses.

* * * * *